March 31, 1936.  L. A. YOUNG  2,035,934
DENTAL HANDPIECE
Filed April 6, 1935
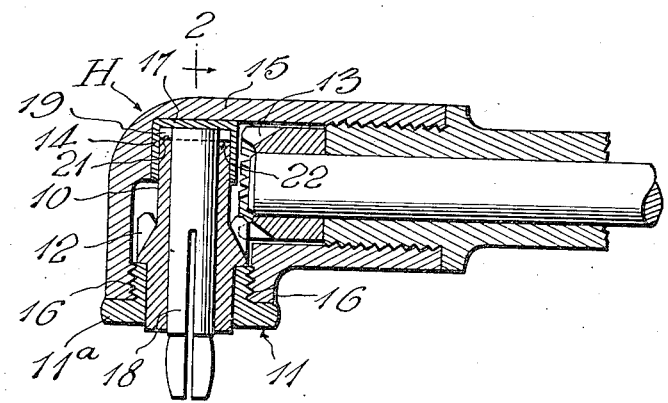
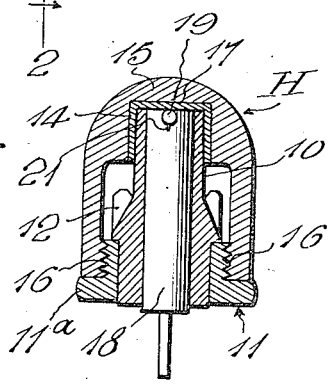
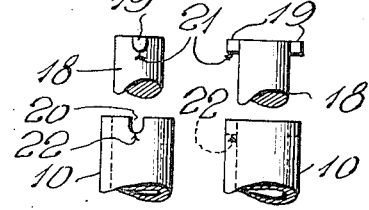
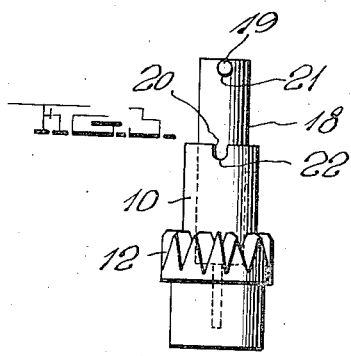
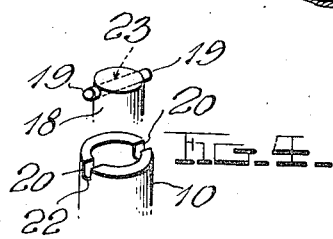
Witness
H. Woodard
Inventor
Luther Alvin Young
By H. R. Willson & Co
Attorneys.

Patented Mar. 31, 1936

2,035,934

UNITED STATES PATENT OFFICE 2,035,934

DENTAL HANDPIECE

Luther Alvin Young, Greeley, Colo.

Application April 6, 1935, Serial No. 15,076

2 Claims. (Cl. 32—27)

The invention relates to dental hand-pieces for driving polishing cups, drills, grinding wheels or other instruments, and while the present disclosure is directed to a hand-piece of angular form, the invention is not restricted thereto.

Heretofore, relatively complicated and expensive provision has been made for securing the shank, spindle or arbor of the instrument which is to be driven, in the arbor-receiving-and-driving sleeve of the hand-piece, often adding materially to the size of the hand-piece and/or presenting objectionably exposed latch portions and the like. Furthermore, difficulty has often been encountered in properly holding the arbor in the arbor-receiving-and-driving sleeve, resulting in slippage of the sleeve upon the arbor when encountering unusual resistance.

It is the object of my invention to provide a new and improved dental hand-piece which will be free from such objections as those above voiced, and with this object in view, the invention resides in the novel subject matter hereinafter described and claimed, description being accomplished by reference to the accompanying drawing.

Figure 1 is a longitudinal sectional view.

Figure 2 is a transverse sectional view on line 2—2 of Fig. 1.

Figure 3 is a detail side elevation showing the arbor partly inserted in the sleeve.

Figure 4 is a fragmentary perspective view of the parts shown in Fig. 3.

Figure 5 is a group view showing a slight variation in the connecting means between the sleeve and arbor.

An angle head H is shown having an arbor-receiving-and-driving sleeve 10 and means 11 for removably holding said sleeve in operative position so that the usual gear 12 of this sleeve meshes with the driving gear 13, the latter being driven by the usual shaft forming part of the dental engine or the like.

In the present showing, a radial-and-end-thrust bearing cup 14 formed of one or more pieces, is secured in the angular body 15 of the head H, said bearing cup rotatably receiving the inner end of the sleeve 10. The means 11 is shown in the form of a ring nut threaded at 16 into the body 15 and abutting the reverse side of the gear 12, holding the sleeve 10 in operative position with the inner end of said sleeve abutting an annular portion of the end wall 17 of cup 14, the sleeve being therefore held against sliding in one direction by this end wall, and against sliding in the other direction by the ring nut 11. This ring nut 11 forms a bearing for the other end of the sleeve 10 and it is provided with a flange 11ª which limits its insertion and tightly abuts the body 15 to prevent loosening of said ring nut. When the ring nut 11 is unthreaded, the sleeve 10 is readily slidable from the body 15 and when said sleeve is so removed, the arbor 18 is inserted into said sleeve from the inner end of the latter.

I provide coacting means on the sleeve 10 and arbor 18 for establishing a driving connection between them when said arbor is inserted into the sleeve. The arbor and sleeve are provided with abutting portions which prevent any outward sliding of said arbor with respect to said sleeve and the arbor and body 15 have coacting end-thrust portions which hold said arbor against any inward sliding with respect to the sleeve. The arbor shown is constructed in accordance with my U. S. Patent No. 1,837,938.

In the present showing, the inner end of the arbor 18 is provided with two lateral driving lugs 19 which are snugly receivable in two notches 20 formed in the inner end of the sleeve 10. Not only do the lugs 19 and notches 20 establish an effective anti-slipping driving connection between the sleeve and arbor, but the surfaces 21 of said lugs abut the inner ends 22 of the notches 20, thereby holding the arbor 18 against outward sliding with respect to said sleeve 10. In the present showing, inward sliding of the arbor is prevented by having its inner end abut the end wall 17 of the bearing cup 14, so that this cup forms an end-thrust bearing for both the arbor 18 and the sleeve 10, as well as constituting a radial thrust bearing for the inner end of said sleeve.

The lugs 19 may be formed on the mandrel or arbor 18 in any suitable way, for instance, by connecting them integrally as shown in Fig. 5 or by passing a pin 23 through an opening in the mandrel or arbor and allowing the ends of said pin to project and form the lugs as in Figs. 1 and 4, the pin being of course fixedly secured in the opening. It will also be understood that while two of the lugs 19 and two of the notches 20 are shown, the invention is not restricted as to number.

The arbor 18 shown for illustrative purposes, is longitudinally split at its outer end and adapted for detachable engagement with a polishing cup (not shown). However, it is of course to be understood that an arbor for driving any kind of an instrument, could be engaged with the sleeve, the only requirement being that the arbor be properly shaped for insertion into the sleeve from the inner end of the latter when said sleeve is removed, and of such form as to properly engage said sleeve and the end-thrust means of the body 15.

It will be seen from the foregoing that a simple dental handpiece has been provided which may be of minimum size, in which the arbor may be effectively held by the driving sleeve without the necessity of embodying complex provision for this purpose and without the necessity of having any projecting latch portions or the like. The improved handpiece is notably shorter from top to bottom than conventional handpieces, permitting its use in more restricted places, and it is free from oil holes to leak oil.

The details disclosed are preferably followed but within the scope of the invention as claimed, variations may, of course, be made.

I claim:—

1. In a dental hand-piece, a head having one end for attachment to a hand grip, said head being of permanently closed construction from said one end to its other end, a driving gear mounted in said head, an arbor-receiving-and-driving sleeve having a gear meshing with said driving gear, means rotatably and removably mounting said sleeve in said head and holding said sleeve against endwise sliding, said head having an end-thrust surface permanently located in one position facing the inner end of said sleeve, an arbor extending through said sleeve and having an end-thrust surface abutting said permanently located end-thrust surface of said head, said sleeve and arbor having interfitting driving portions constructed for separation only by withdrawal of said arbor through the inner end of the sleeve, said permanently located end-thrust surface and the abutting end-thrust surface of the arbor preventing said withdrawal of the arbor from the sleeve until said sleeve and arbor are bodily removed from said head; said sleeve-mounting means, said sleeve and said head being constructed to allow removal of said sleeve and the arbor through said other end of said head without molesting said driving gear.

2. In a dental hand-piece, a head having one end for attachment to a hand grip, said head being of permanently closed construction from said one end to its other end, a driving gear mounted in said head, an arbor-receiving-and-driving sleeve in said head having a gear meshing with said driving gear, said head having a radial and end-thrust bearing socket permanently located in one position within its interior, the inner end of said sleeve being rotatable in said socket, a ring nut having threaded engagement with said other end of said head and holding said sleeve against movement away from the end wall of said socket, said sleeve being slidable endwise away from said socket end wall when said ring nut is unthreaded from said head and having its inner end of sufficiently small diameter to prevent it from striking said driving gear, whereby said sleeve may be entirely withdrawn endwise from the head, and an arbor whose inner end portion is received in said sleeve and abuts said end wall of said socket, said inner end of said arbor being provided with a lateral projection, said inner end of said sleeve being provided with a notch opening toward said socket end wall and removably receiving said projection, whereby it is necessary to unthread said ring nut and bodily remove said sleeve and arbor from said body before said arbor can be removed from said sleeve.

LUTHER ALVIN YOUNG.